Figure 2:
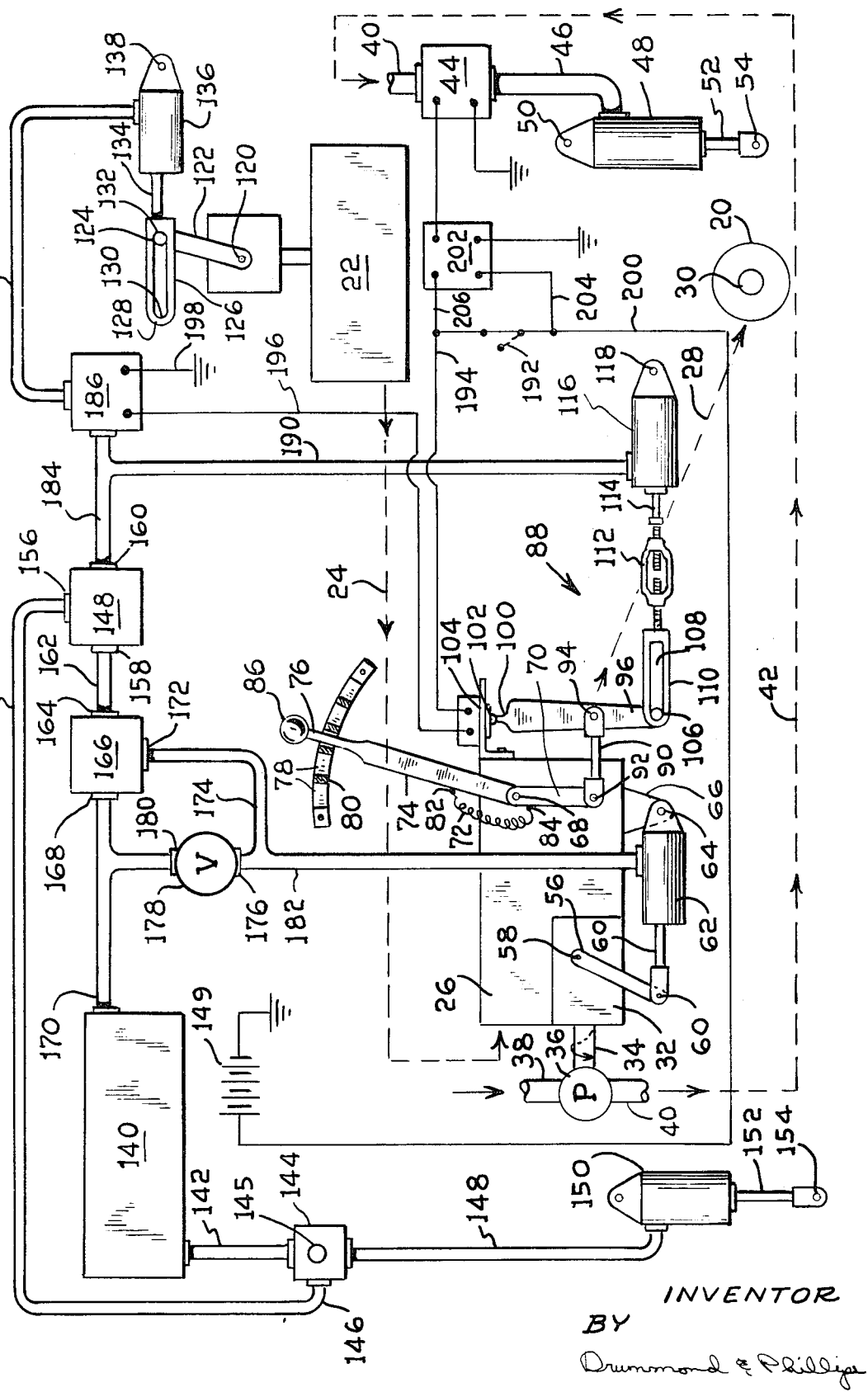

United States Patent
La Voie

[15] 3,667,629
[45] June 6, 1972

[54] CONTROL AND POWER APPARATUS FOR OPERATING TRASH COLLECTION VEHICLE PACKERS

[72] Inventor: Francis X. La Voie, 2818 North 51 Street, Phoenix, Ariz. 85018

[22] Filed: Feb. 16, 1971

[21] Appl. No.: 115,188

[52] U.S. Cl. ............................214/83.3, 214/82, 192/4 A
[51] Int. Cl. .........................................................B65f 3/00
[58] Field of Search ..................214/82, 83.3; 192/4 R, 4 A, 192/4 C

[56] References Cited

UNITED STATES PATENTS

| | | |
|---|---|---|
| 3,033,333 | 5/1962 | Breting et al............................192/4 A |
| 3,444,968 | 5/1969 | Golan et al.............................192/4 A |
| 3,565,220 | 2/1971 | Lammers................................192/4 A |

Primary Examiner—Albert J. Makay
Attorney—Drummond & Phillips

[57] ABSTRACT

A control and power apparatus for operating trash collection vehicle packers wherein a trash collecting vehicle is provided with a chassis and wheels driven by an engine carried on the chassis and wherein emergency brakes for the wheels are manually controlled and wherein means is provided for automatically shifting the transmission of the vehicle to neutral position when the emergency brakes of the vehicle are applied; and means is responsive to the shifting of the transmission to neutral position to increase the speed of the vehicle engine to provide sufficient torque for operating a hydraulic pump in connection with the vehicle engine for delivering sufficient power to operate the trash packer mechanism of the trash collection vehicle.

9 Claims, 3 Drawing Figures

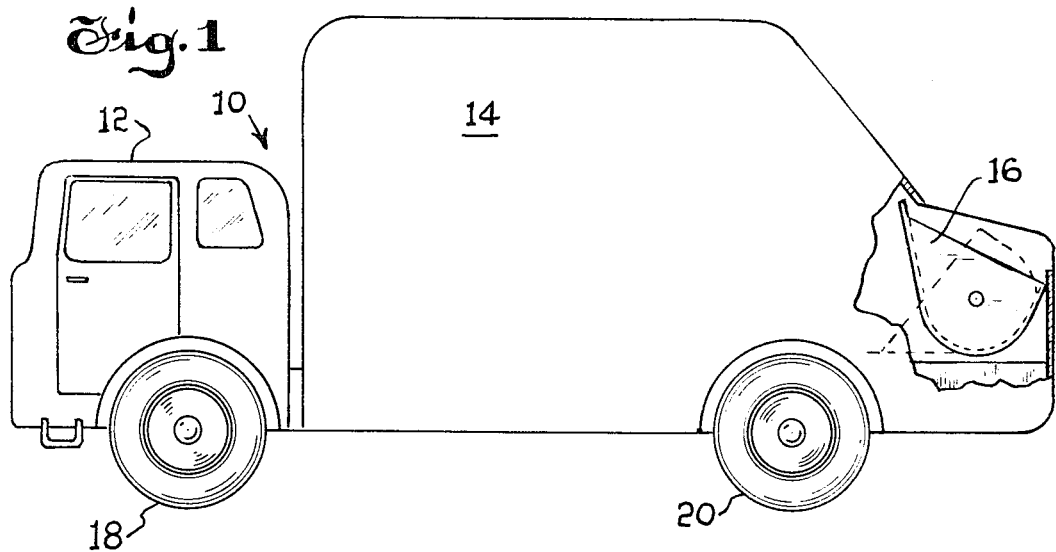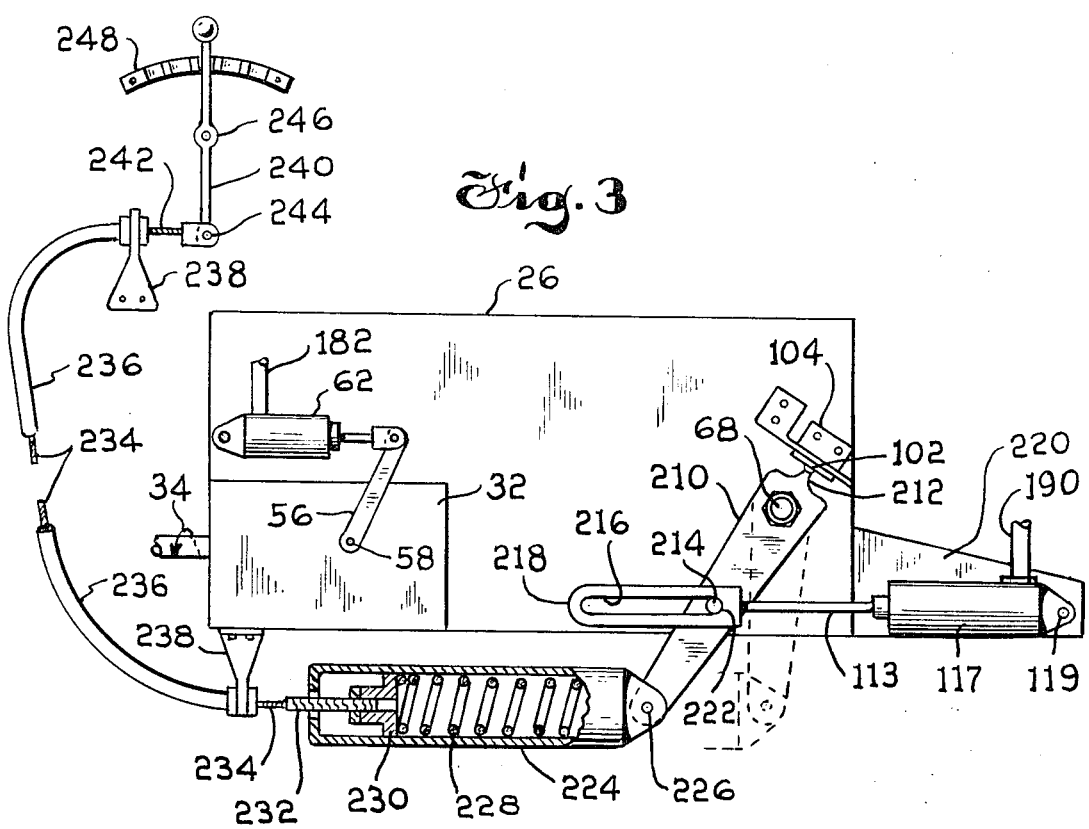

CONTROL AND POWER APPARATUS FOR OPERATING TRASH COLLECTION VEHICLE PACKERS

Conventional controls and power apparatus for operating trash collection vehicle packers are either relatively expensive or somewhat inconvenient to operate. Operation of a trash packer carried on a trash collection vehicle permits the collection of a large amount of trash and the packing of the trash in a compact manner in the vehicle so that a minimum number of trips to the dump need be made for the collection and disposal of a given amount of trash.

Many of the trash collecting vehicles utilize trash packers either at the rear end or the side thereof such that the trash packer may be operated each time a stop is made for the compaction of the trash in the body of the collection vehicle.

Some prior art trash collection vehicles and packers employ not only an engine to operate the vehicle but also an auxiliary engine to drive the hydraulic pump for delivering hydraulic pressure to the actuating cylinders of the packer mechanism. Many of these auxiliary engines are quite expensive initially to procure and also to maintain.

The installation and operation of an auxiliary engine on a trash collection vehicle, for the purpose of powering the trash packer, creates many problems one of which involves downtime due to the necessity of performing maintenance or overhaul work relative to the auxiliary engine. Thus, many trash collection vehicles using auxiliary engines are oftentimes incapacitated due to some maintenance problem relative to the auxiliary engine.

Other prior art trash collection vehicles and packers utilize a power take-off driven by the main transmission of the trash collection vehicle, this main transmission being the one used in connection with the engine to drive the wheels of the vehicle. These conventional units, utilizing a power take-off and main transmission to drive the hydraulic pump for powering the trash packer, generally imposes additional work on the driver of a trash collection vehicle since it is necessary that the driver must shift his transmission to neutral each time he stops in order to cycle the trash packer which is driven by the power take-off from the transmission.

Additionally, in the operation of such prior art equipment, the driver of the vehicle must receive a signal from the pickup men on the rear of the truck so that the driver may known when to operate the trash packer. Thus, the driver is required continuously to shift the transmission to neutral and wait for a signal from the men on the ground to cycle the trash packer. The foregoing mode of operation greatly slows down the collection and packing of trash in a trash collection vehicle and causes greater wear and tear on equipment and longer working days for the men on the ground as well as the driver of the trash collecting vehicle. The first mentioned prior art arrangement utilizing an auxiliary engine allows constant hydraulic pump pressure so that the packer mechanism in the trash collection vehicle may be cycled for packing trash in the hold of the vehicle at any time. The second mentioned prior art arrangement utilizing the power take-off unit in connection with the vehicle transmission can only be cycled while the vehicle is moving or by shifting manually into neutral when the vehicle is stopped.

In accordance with the present invention a power take-off, coupled to the vehicle engine of transmission, is of the constantly operable type which may be coupled with a hydraulic pump for driving the hydraulic pump at any time when the vehicle engine is running and when the transmission is in neutral position to interrupt the operation of the drive shaft for driving the rear wheels. Thus, according to the present invention, a power take-off in connection with the main engine of a vehicle may be utilized at any time, independently of the driving of the rear wheels or during the driving of the rear wheels, for powering a hydraulic pump and delivering hydraulic pressure to operate actuating cylinders of a trash packer unit on the vehicle. The invention also comprises means for constantly driving a hydraulic pump by means of a power take-off, driven by the engine, and for automatically shifting the transmission to a neutral position when the emergency brakes of the vehicle are applied. Means is automatically responsive to the shifting of the transmission to neutral position and responsive to manual operation of a trash packer control switch for increasing engine speed so that the engine is capable of providing sufficient torque for driving the hydraulic pump to create adequate hydraulic pressure for the actuating cylinders or equipment used to operate the trash packer carried on the truck chassis.

Accordingly, the present invention is very simple to operate since the operator need only apply the emergency brake at each stop and the trash packer may then be operated by a control switch at the rear of the vehicle operable by the men on the ground after they have loaded the receiver of the trash packer at each stop. The invention does not require the operator of the truck to shift gears or to receive signals from the men on the ground for the operation of the packer. All that the driver need do is to apply the emergency brake at each stop and release it when the men on the ground given an audible signal and the trash packer may be continued in its cycle of operation as the vehicle moves between stops.

The invention employs a neutral switch which is automatically operable when the invention automatically shifts the transmission to neutral in response to the operation of the emergency brake and the trash packer control switch at the rear of the trash collection vehicle. The trash packer control switch is in series with the neutral switch so that the engine throttle is automatically operated through the neutral switch for increasing the speed of the engine and the torque thereof for operating the trash packer at any time after the emergency brake control and the trash packer control switch have been actuated.

In accordance with the foregoing, the automatic operation of the engine throttle, from an idle position to a relatively open position, increases engine speed such that the torque of the engine is increased each time the transmission is shifted to neutral and the hydraulic pump driven by the engine delivers sufficient power to operate the hydraulic equipment which drives the trash packer carried on the trash collection vehicle.

The invention employs compressed air from a conventional air brake compressed air reservoir for the operation of actuators and pilot controlled pneumatic valves for automatically engaging the power take-off in connection with the hydraulic pump for supplying power to the trash packer. The emergency brake control of the vehicle functions so that one of the pilot operated valves is automatically operated when the emergency brake is applied and such that this pilot valve initiates operation of a pneumatic actuator for shifting the vehicle transmission to neutral position. A resilient override means permits the normal gear selecting lever manually to be placed in a fixed drive detent position while a power operated actuator shifts the transmission to neutral position so that when the said power operated actuator is de-energized the resilient override means automatically returns the transmission to the preselected drive position when the emergency brake is released.

In accordance with the present invention, the packer operation control switch may be closed during the application of the emergency brake so that the power take-off may also be engaged with the engine while power operated means actuates the engine throttle for increasing the engine speed to furnish sufficient power to operate the hydraulically powered packer and the throttle actuator will be maintained at a constant throttle position for increased engine speed over and above normal idle speed until the emergency brake is released or until the packer operating cycle has been completed.

Accordingly, it is an object of the present invention to provide a control and power apparatus for operating trash collection vehicle packers which is very economical to install and maintain in connection with trash collection vehicles.

Another object of the invention is to provide a control and power apparatus for operating trash collection vehicle packers which operates on a very rapid cycle basis in relation to intermittent stops made for collection of trash and in relation to personnel cooperating with a trash collection vehicle.

Another object of the invention is to provide a control and power apparatus, for operating trash collection vehicle packers, which reduces the operating tasks of a trash collection vehicle driver and improves the cooperable relation between the driver and the men on the ground who place trash in the receiver of a trash packer carried on the vehicle.

Another object of the invention is to provide novel means in connection with a vehicle emergency brake for shifting the vehicle transmission to neutral and for automatically operating the vehicle engine throttle to increase the operating speed above normal idle speed so that the engine of the vehicle may drive a hydraulic pump at sufficient speed to provide sufficient power to operate a trash packer carried on the vehicle.

Another object of the invention is to provide a novel resilient override between a gear ratio selection lever and a gear shifting lever on a vehicle transmission so that automatic means of the invention may be utilized to actuate the shifting lever into a neutral position while the gear selection lever is in a selected drive position during a time when the vehicle emergency brake is applied and when the vehicle is stopped to pick up trash.

Another object of the invention is to provide a novel control system utilizing a neutral switch operable in conjunction with mechanism for shifting the vehicle transmission to neutral; the neutral switch being in series circuit with a packer control switch and thus, adapted to energize a solenoid valve for momentarily conducting fluid to an actuator which opens the engine throttle slightly above idling speed position so that the engine may be automatically operated at increased speed to provide sufficient torque for operating a hydraulic pump which supplies hydraulic pressure fluid for actuating a trash packer on the trash collection vehicle in accordance with the present invention.

Another object of the invention is to provide a novel combination of pneumatic, hydraulic and electrical and mechanical equipment for automatically shifting a vehicle transmission into neutral when the emergency brake of the vehicle is applied and for automatically engaging a power take-off with the main engine of the vehicle to operate a hydraulic pump for supplying power to a hydraulically operable packer and further means automatically operable and responsive to operation of the emergency brake and a packer control switch for increasing engine speed during operation of the hydraulic pump for energizing the hydraulically operated trash packer.

Another object of the invention is to provide a control and power apparatus for operating trash collection vehicle packers which permit the driver to simply apply the emergency brake and then wait for a signal from the men on the ground to proceed to the next stop.

Further objects and advantages of the invention may be apparent from the following specification, appended claims and accompanying drawings, of which:

FIG. 1 is a side elevational view of a conventional trash collection vehicle showing a portion of the rearward end of the vehicle fragmentarily to expose a receiver element of a conventional trash packer;

FIG. 2 is a diagrammatic view showing pneumatic, hydraulic, electrical and mechanical elements of a control and power apparatus for operating trash collection vehicle packers; and FIG. 3 is an enlarged diagrammatic view showing mechanically a modified resilient override mechanism for use in control of a trash collection vehicle transmission so as to permit the transmission to be selectively shifted as to its output ratio and wherein a ratio selecting lever is provided with resilient override mechanism connecting it to a transmission shifting lever.

As shown in FiG. 1 of the drawings, a trash collection vehicle 10 is provided with a chassis carrying an operator cab 12 and a trash storage body 14 having a trash packer receiver 16 at the normally rearend thereof.

The chassis of the trash collection vehicle 10 is provided with front steerable wheels 18 and rear drive wheels 20 adapted to be driven by means of a main engine 22 shown in FIG. 2 of the drawings, this engine 22 being shown diagrammatically in FIG. 2 and provided with a conventional coupling 24 to a conventional hydraulic transmission 26. The coupling 24 may be the usual bolt-up arrangement and it will be understood that the engine 22 may drive a conventional manual shift transmission if desired.

Coupled to the transmission 26 is a driveline indicated diagrammatically by broken line 28 and this drive line 28 extends to a differential mechanism 30 coupled to the rear wheels 20 of the vehicle as shown in FIG. 1 of the drawings. Thus, the engine 22, transmission 26, drive line 28, and differential 30 are adapted to drive the rear wheels 20 to motivate the entire trash collection vehicle 10.

A power take-off 32 is a conventional gear driven power take-off particularly adapted to various truck transmissions and this conventional take-off 32 is well known for operating a great variety of equipment such as electrical, hydraulic or mechanical devices such as winches or the like.

It will also be obvious that the power take-off 32 may be driven by the engine 22 either directly or through the transmission 26 as desired. For example, a conventional electrical cluth such as used to drive refrigeration compressors may couple the engine 22 directly with the power take-off 32 and this may be done at the front end of the engine crank shaft if desired.

Other equivalent means of driving the power take-off 32 may be resorted to all in accordance with the skill of the art. However, in accordance with the present invention, it is desired that the main engine 22 drive the power take-off 32 whether it be a conventional gear driven take-off or whether it be a belt-driven mechanism using an electrical clutch or the like.

The power take-off 32 is provided with a rotary shaft 34 adapted to drive a positive displacement hydraulic pump 36 having an inlet conduit 38 and an outlet conduit 40 which is partly indicated diagrammatically by a broken line 42, in FIG. 2 of the drawings. This conduit 40 is coupled to a solenoid valve 44 adapted to deliver hydraulic pressure fluid to a conduit 46 coupled with the hydraulic cylinder 48 which may be one of the cylinders utilized by the conventional trash packer 16 shown in FIG. 1 of the drawings.

The cylinder 48 is provided with a stationary pivot pin 50 for stationarily supporting the cylinder 48 in connection with the body structure of the vehicle 10. The cylinder 48 is also provided with a plunger 52 having a clevis 54 adapted pivotally to be coupled to mechanism to be actuated in connection with the trash packer mechanism 16. It will be understood that trash packer mechanisms are well developed and that several of the cylinders 48 may be utilized in connection with the various mechanism of a complete trash packer such as the Heil packer Model No. A612-610. The Heil packer is well known and, therefore, reference is made to it on the basis that it is such as to be operated by a plurality of the hydraulic cylinders 48 disclosed diagrammatically in FIG. 2 of the drawings.

It will be understood that input gears operating the power take-off 34 run constantly even when the transmission 26 is shifted into neutral position and the vehicle is stopped or when the transmission is in gear and the vehicle is moving. The power take-off 34 is provided with a shifting lever 56 adapted to pivot a shaft 58 for engaging constantly operable drive gears in the transmission 26 with the shaft 34 for operating the pump 36 whenever the engine 22 is running and when the transmission 26 is in either neutral or driving position, such that the hydraulic pump 36 may be operated when the trash collection vehicle 10 is at a stop or when it is moving along with the wheels 20 driving it on a roadway.

A pin 60 pivotally connects the lever 56 to a plunger 61 of a pneumatic cylinder 62.

The pneumatic cylinder 62 is pivotally mounted on a pin 64 carried by a bracket 66 in connection with the transmission 26.

The transmission 26 is provided with a gear ratio shifting shaft 68 which is rotatably mounted in connection with the transmission and adapted to shift mechanism internally thereof to vary the ratio thereof or to shift the transmission into neutral or reverse. This shaft 68 when rotated to a particular position as will be hereinafter described, shifts the transmission into neutral so that the drive line 28 and the differential 30 as well as the wheels 20 are not rotated.

Coupled to the shaft 68 is a shifting lever 70 which is coupled by a resilient override spring 72 to a ratio selecting lever 74. This lever 74 is manually operable by personnel in the cab 12 for selecting drive ratios as well as neutral or reverse.

The lever 74 is provided with a detent engaging portion 76 adapted to engage any one of a plurality of positive lever holding detent notches 78 in a detent rack 80 which is fixed in the cab 12.

The resilient override spring 72 is fixed at one end 82 to the lever 74 and is fixed at its opposite end 84 to the shifting lever 70. Accordingly, this spring has sufficient rigidity normally to operate the levers 70 and 74 in unison by manual actuation of a knob 86 in connection with the ratio selecting lever 74. With such rigidity of the resilient override spring 72, the levers 74 and 70 normally act in unison as one lever to rotate the shaft 68 and to shift the internal mechanism of the transmission 26 to vary ratios or to go into reverse or into a neutral position as desired.

Coupled to the shifting lever 70 is an automatic neutral shifting mechanism 88. This mechanism 88 is provided with a link 90 pivotally connected by a pin 92 to the transmission shifting lever 70 and a pin 94 connects the link 90 to a lever 96 of the mechanism 88.

The lever 96 is pivoted on a pin 98 carried by a bracket stationarily mounted on the transmission 26.

The upper end of the lever 96 is provided with a switch actuating nib 100 adapted to engage a switch button 102 of a switch 104 which serves as a neutral switch in accordance with the invention. This switch 104 is stationarily mounted on the side of the transmission 26 so that the nib 100 of the lever 96 engages and operates the switch 104 when the shifting mechanism 88 moves the shifting lever 70 into neutral position as will be hereinafter described in detail.

Carried by the lever 96 is a pin 106 which is disposed in an elongated slot 108 of an actuating member 110. This actuating member 110 is coupled by means of an adjustable turnbuckle 112 to a spring loaded plunger 114 of a pneumatic actuating cylinder 116 which constitutes a power operated device for moving the mechanism 88 and shifting the lever 70 of the transmission to a neutral shifting position. The pneumatic cylinder 116 is stationarily mounted on the vehicle chassis by means of a pivot pin 118.

The plunger 114 as shown in FIG. 2, is in retracted position wherein the actuating member 110, at one end of the slot 108, is engaged with the pin 106 wherein the lever 96 and the lever 70 are held in neutral position and wherein the switch 104 is in energized position.

When the plunger 114 of the cylinder 116 is extended, by spring pressure, the actuator 110 is disposed such that the pin 106 is substantially in the middle of the slot 108 and that the pin 106 is free to move back and forth therein without interference of the actuator 110 in connection with the plunger 114 of the cylinder 116. Thus, normal shifting of the lever 70 in connection with the lever 74 is freely accomplished.

The engine 22 is provided with a throttle shaft 120.

The throttle shaft 120 carries an auxiliary lever 122 having a pin 124 operably disposed in a slot 126 of an actuator 128. The slot 126 is elongated and is provided with closed ends 130 and 132. In the position as shown in FIG. 2 of the drawings, the actuator is disposed relative to the pin 124 such that the end 132 of the slot 126 is engaged with the pin 124 and holding the lever 122 in position to hold the throttle shaft 120 at a throttle position substantially greater than idle position. Thus, engine operating speed or rotating speed of the engine 22 is maintained somewhat above normal idling speed and so as to provide sufficient power to the transmission 26, power take-off 32 and pump 36 to deliver substantial hydraulic fluid pressure to the cylinder 48 and other similar cylinders in connection with the Heil packer unit 16 so that this unit may be operated efficiently as will be hereinafter described.

Coupled to the pin 124 is a plunger 134 of a conventional pneumatic cylinder 136 pivotally mounted on a stationary pin 138 carried by the chassis of the trash collection vehicle 10.

The cylinder 136 is similar to the cylinder 116 hereinbefore described, and both of these cylinders are pneumatic cylinders normally supplied pneumatic fluid pressure from a conventional pneumatic pressure fluid reservoir 140 of a conventional pneumatic brake system common to many trucks and busses.

The reservoir 140 is preferably a tank adapted to carry a substantial volume of air under pressure for operating conventional pneumatically operable brakes. Communicating with the interior of this reservoir 140 is a pneumatic pressure conduit 142 coupled to a three-way valve 144 having a manually operable button or knob 145 adapted to cause the exhaust of air from a pneumatic cylinder 150 which may be used in connection with the vehicle brakes to operate them. A conduit 147 couples the valve 144 with the cylinder 150 as shown in FIGS. 2.

The cylinder 150 is provided with a plunger 152 and a clevis 154 adapted to connect to the conventional brake actuating mechanisms. Several of the cylinders 150 may be utilized in connection with the brakes of a vehicle as desired.

It will be understood that this system is used in connection with the conventional brake systems wherein springs are disposed to apply the brakes and the cylinders are disposed to release the brakes against compression of the springs. Accordingly, when the cylinder 150 is energized with pneumatic pressure fluid it releases the brakes against compression of the springs and when the valve 144 is operated air is released from the cylinder 150, via the conduit 147, allowing the springs to apply the brakes. Concurrently, when the three-way valve 144 is operated the valve 144 conducts pneumatic fluid under pressure through a conduit 146 to a pilot operated valve 148.

When the valve 144 is not manually operated, the flow of pneumatic fluid under pressure through the conduit 146 is shut off.

The conduit 146 is coupled to inlet 156 of the pilot operated valve 148. The inlet 156 is a pilot fluid pressure inlet and the pilot operated valve 148 has a main fluid pressure inlet 158 and a main fluid pressure outlet 160. The main fluid pressure inlet 158 is coupled to a conduit 162 which in turn is coupled to a main fluid pressure outlet 164 of a pilot operated pneumatic valve 166. This valve 166 is provided with a main fluid pressure inlet 168 communicating with a conduit 170 which communicates with the interior of the fluid pressure reservoir 140.

The pilot operated valve 166 is provided with a pilot pressure inlet 172 which communicates with a conduit 174 coupled to an outlet 176 of a manually operable shutoff valve 178. This valve 178 has an inlet 180 communicating with the interior of the conduit 170 and the fluid pressure reservoir 140.

Communicating with the outlet 176 of the manually operable shutoff valve 178 is a conduit 182 adapted to deliver pneumatic fluid pressure to the interior of the cylinder 62 which operates the lever 56 of the power take-off 32 as hereinbefore described.

The pilot operated valve 148, at its outlet 160, communicates with a conduit 184 for delivering fluid under pressure to a solenoid valve 186, which when energized delivers pneumatic fluid pressure through a conduit 188 to the pneumatic cylinder 136 hereinbefore described.

Communicating with the conduit 184 and the outlet 160 of the pilot operated valve 148 is another conduit 190 which delivers pneumatic fluid pressure to the interior of the pneumatic cylinder 116 for extending the plunger 114 thereof and for actuating the actuator 110 relative to the pin 106 as hereinbefore described.

The switch 104 is connected in series with a packer operating control switch 192. This is a normally open switch coupled to a battery 149 and also electrically coupled in series with the switch 104 by means of electrical conductors 194 and 196. The conductor 196 is coupled to the switch 104 and the solenoid valve 186 which is provided with a ground connection 198.

The switch 192 is coupled to conductor 200 which is connected to the battery 149 as disclosed in FIG. 2 of the drawings.

A packer control unit 202 is coupled to the conductor 200 by means of a conductor 204 and another conductor 206 is coupled to the conductor 194 and switch 192 as shown in FIG. 2 of the drawings. This conductor 206 is adapted to operate as a pilot or relay energizing means for energizing the control 202 such that it may control the sequence of operation of the conventional Heil packer.

It will be understood that the control 206, solenoid valve 44 and cylinder 48 shown in FIG. 2 are only diagrammatic and constitute only individual parts of a system of the Heil packer which may include several cylinders 48 in connection with suitable fluid supply conduits, solenoid valves and controls together with the various limit switches that are included in such a packer mechanism. This packer mechanism is no part of the present invention but merely disclosed in a minimal diagrammatic relationship to the remainder of the system of the invention in order to teach those skilled in the art the relationship of the packer operating control switch 192 with the other features of the invention.

In operation of the control and power apparatus for operating trash collection vehicle packers, an operator takes a position in the cab 12 and drives the vehicle 10 in the usual manner. As the operator approaches a stop for the collection of trash or garbage, the manually operable valve 178 may be opened in order to supply pneumatic fluid pressure to the shifting mechanism 62 for shifting the power take-off mechanism into gear so that it will be constantly operated by the transmission 26 whether the vehicle is moving or not and thus, the pump 36 may be continually operated for supplying adequate fluid pressure to maintain operation of the packer 16 by means of the cylinders 48 hereinbefore described.

Once the valve 78 has been opened, it remains in open position during the entire day's work normally to collect trash. When the operator arrives at his first stop, he operates the switch 146 which sets the emergency brake of the vehicle. This is done after the vehicle is brought to a stop by means of the conventional foot operated brakes. When the emergency brake is set, as hereinbefore described, fluid pressure is exhausted from the cylinders 150 and the brakes are applied by the hereinbefore described springs, and pneumatic fluid pressure is supplied through the conduit 146 to the pilot pressure inlet 156 of the pilot operated valve 148.

With the shutoff valve 178 in open position, fluid pressure existing in the conduit 174 at the inlet 172 of the pilot operated valve 166 causes main fluid pressure to pass from the conduit 170 to the conduit 162. Accordingly, it will be appreciated that the valves 166 and 148 are conventional pilot operated valves and, therefore, when pilot operating pressure passes through the conduit 146 to the pilot operated valve 148, it conducts fluid under pressure into the conduit 184.

It will be appreciated that when the manual shutoff valve 178 is initially opened, it energizes both the cylinder 62 and the pilot operated valve 166 so that when the valve 144 is operated, pilot operating pressure opens the pilot operated valve 148 and immediately conducts fluid under pressure to the pneumatic cylinder 116 through the conduit 190. The cylinder 116 immediately retracts its plunger 114 to the position shown in FIG. 2 of the drawings, shifting the lever 96 together with the lever 70 as hereinbefore described, such that the transmission 26 is shifted into neutral position to deactivate operation of the drive shaft 28 and wheels 20. In this position, the lever 96 at its upper end 100 engages the button 102 of the switch 104 causing it to close at the same time the transmission 26 is shifted into neutral position. In the position as shown, the mechanism 88 has caused the resilient override spring 72 to become extended due to the fact that the ratio selector lever 74 is in a drive position and held in one of the detent slots 78 in the detent bar 80. Accordingly, the driver of the vehicle need not shift into neutral inasmuch as this is accomplished automatically by the cylinder 116 when the emergency brake operating switch 146 is actuated.

When the men on the ground have collected the trash at a given stop and have placed it in a receiver 16 of the Heil trash packer, one of the men may actuate the switch 192, which causes conduction through the previously closed switch 104 for energizing the solenoid valve 186 and conducting fluid pressure through the pneumatic fluid pressure conduit 188 to the cylinder 136 which then extends its plunger to the position shown in FIG. 2 of the drawings, causing the end 132 of the slot 136 to engage the pin 124 and force the lever 122 to actuate the engine throttle to a position somewhat beyond the idling position to thereby increase the speed of the engine 22 so that it may produce sufficient torque to drive the transmission 26, power take-off 32, pump 36 and the various cylinders 48 of the packer mechanism. It will be understood that all of this happens automatically with the closing of the switch 192. At the moment that a man on the ground or one of the trash loaders closes a switch 192, he may vocally signal the operator of the truck in the cab 12 who then releases the valve thereby automatically releasing the brakes and automatically exhausting the air from the cylinder 116 through the valve 148 to thereby place the slot 108 of the actuator 110 in a midway position relative to the pin 106 so that the override spring 72 may return the shifting lever 70 into alignment with the ratio selecting lever 74 and to shift the transmission back into the drive position previous selected. Accordingly then, the operator need not operate the transmission at each stop but need only to set the emergency brake by means of the valve 144 and to use the engine throttle in the conventional manner. Engine throttle operations are not impeded, by means of the actuator 126, since full throttle action causes the pin 132 to move in a position or direction away from the end 132 of the slot 126 shown in FIG. 2 of the drawings, and, therefore, the engine may continue to operate the pump 36 and the cylinder 48 while the vehicle is in motion. Thus, complete cycling of the trash packer may continue after the switch 192 is closed and after the truck starts moving to the next pickup stop.

When the emergency brake is released, the engine resumes idle speed and when the engine speed is then increased by manual throttle operation, the transmission engages to drive the vehicle and the power take-off 32 so that power is provided to operate the trash packer when the vehicle 10 is in motion.

It will be understood that the switch 192 may be merely a momentary push button switch and that the control 202 as well as the control for the solenoid valve 186 may be relay or timer operated as desired. Additionally, the switch 192 may be held by one of the men on the ground so as to maintain a closed circuit until the packer cycle is finished. This may be a conventional mode of operation where the men on the ground ride the bumper of the vehicle 10 at its rear end and in this manner, the switch 192 may be held closed during the entire packer cycle if desired.

In the modification as shown in FIG. 3 of the drawings, the transmission 26 is similar to that shown in FIG. 2 of the drawings, the power take-off 32 and power take-off output shaft 34 are also similar to that shown in FIG. 2 of the drawings. The pneumatic cylinder 62 is located in a different position from that shown in FIG. 2 but is equivalent in operation.

As shown in FIG. 3, the gear shifting lever of the transmission 26 is designated 210 and is equivalent to the lever 70 shown in FIG. 2 of the drawings. This shifting lever 210 is provided with a nib 212 similar to the nib 100 of the lever 96 and this nib 212 is adapted to engage the button 102 of the neutral switch 104 hereinbefore described.

The lever 210 shown in FIG. 3, carries a pin 214 equivalent to the pin 106 shown in FIG. 2 of the drawings, however, this pin 214 is applied directly to the lever 210 rather than to a lever such as the lever 96 shown in FIG. 2 of the drawings.

The pin 214 is disposed to be operable in a slot 216 of a pin actuator 218 carried by a spring loaded plunger 113 of a pneumatic cylinder 116. A pneumatic cylinder 117, at its pivotal mounting provided by a pin 119, is carried on a bracket 220 fixed to an end of the transmission 26 all as shown best in FIG. 3 of the drawings.

The slot 216 of the pin actuator 218 is provided with a closed end 222 adapted to engage the pin 214 for actuating the shifting lever 210 into neutral position in a similar manner as hereinbefore described in relation to the lever 70 shown in FIG. 2 of the drawings.

When the plunger 113 of the cylinder 117 is retracted by spring pressure, the elongated slot 216 of the pin actuator 218 is in an intermediate position allowing free travel of the pin 214 in the slot 216 so that the lever 210 may be shifted to various ratio selecting positions for holding the shaft 68 in various drive or reverse positions as desired.

Pivotally coupled to a normally lower end of the shifting lever 210 is an override spring containing housing 224, this housing 224 is pivotally mounted on a pin 226 carried at the normally lower end of the lever 210 and disposed in the housing 224 is a resilient override spring 228 engaged by a piston 230 slidably mounted in the hollow cylindrical housing 224. Coupled to the piston 230 is a solid adjustable shank 236 connected to a flexible cable 234 movable in a flexible sheath 236 having its lower end fixed to a bracket 238 which is secured to the transmission 26.

The normally upper end of the flexible sheath 236 is fixed to a bracket 238 and the bracket 238 is fixed to the chassis of the vehicle 10 in adjacent relationship to a gear selecting lever 240 similar to the lever 74 described in connection with the disclosure of FIG. 2.

The flexible cable 234 is provided with a normally upper end 242 having a clevis 244 pivotally connected to a normally lower end of the lever 240. The lever 240 is a ratio selecting lever similar to the lever 74 and this lever 240 is pivotally mounted on a pin 246 maintained in stationary position in the cab 12 of the vehicle 10.

A detent bar 248 is similar to the bar 80 hereinbefore described and is adapted for holding the ratio selecting lever 240 in any one of several drive positions in a similar manner as hereinbefore described in relation to the lever 74.

In operation, the modification of the invention functions to provide for automatic shifting of the transmission 26 into neutral position and automatic return of the transmission to a preselected drive ratio; all of this being accomplished by operation of the pneumatic cylinder 117 as hereinbefore described.

The resilient override mechanism constituted by the housing 224, spring 228 and piston 230 functions such that when the plunger 113 of the cylinder 117 is extended, the end 222 of the slotted portion 216 of the pin actuator 218 engages the pin 214 and forces the shifting lever 210 to a neutral position activating the switch 104 and causing compression of the spring 228 in the housing 224 against an end of the piston 230 which is held in fixed position by the cable 234 and the ratio selecting lever 240 is held in a detent of the detent bar 248.

It will be seen that the hollow cylindrical housing 224 slides over the piston 230 when the spring 228 is compressed as the shifting lever 210 is moved to neutral position by the plunger 113 of the pneumatic cylinder 116.

When pneumatic pressure is released from the cylinder 117, the end 222 of the slotted portion 216 moves away from the pin 224 and allows compression of the spring 228 to return the shifting lever 210 to a position compatible with the preselected ratio with which the lever 240 is related by means of detents in the detent bar 248.

The preload of the spring 228 in the housing 224 is sufficient normally to move the shifting lever 210 to any of the various drive ratio positions in the transmission 26 and when the plunger 113 of the cylinder 117 is retracted, the pin 214, carried by the lever 210, may freely traverse the slotted portion 216 of the pin actuator 218 in both directions.

It will be obvious to those skilled in the art that various modifications of the invention may be resorted to without departing from the spirit thereof.

I claim:

1. A control and power apparatus for operating trash collection vehicle packers comprising: a vehicle chassis having a hydraulically operable trash packer thereon; wheels supporting said chassis; a driving engine on said chassis; a transmission driven by said engine; said wheels driven by said transmission; a power take-off driven by said engine; a hydraulic pump driven by said power take-off; power operated brake actuating means disposed and adapted to actuate brakes for said vehicle wheels; manually operable means for operating said brake actuating means; second means disposed to couple said power take-off with said engine to start operation of said hydraulic pump to supply hydraulic operating pressure to actuate said trash packer; first conduit means for conducting hydraulic fluid under pressure from said pump to said hydraulically operable trash packer; third means responsive to the operation of said brake actuating means and adapted to shift said transmission to neutral position so that driving force from said transmission to said wheels is automatically interrupted when said brake actuating means is operated to brake said wheels; a neutral switch operably responsive to said third means when said transmission is shifted to neutral position; an engine throttle for controlling the speed of said engine; fourth means having a power operated actuator coupled to said neutral switch for moving said throttle in a direction to increase the speed of said engine; and a manually operable trash packer control switch in series circuit with said neutral switch, whereby said fourth means is energized through said neutral switch when said trash packer control switch is operated and whereby the speed of said engine is automatically increased to provide enough torque for driving said pump at a speed to develop sufficient hydraulic force to operate said trash packer.

2. A control and power apparatus for operating trash collection vehicle packers comprising: an engine driven trash collection vehicle having wheels and a trash packer thereon; said vehicle having a drive ratio changing and motivating transmission disposed and adapted to drive wheels of said vehicle; a power take-off coupled to said transmission; a first air cylinder disposed and adapted to shift said power take-off into and out of driven relation to said transmission; a hydraulic pump coupled to said power take-off and adapted to be driven thereby; a compressed air reservoir; a first valve having an inlet adapted to receive compressed air from said reservoir; said first valve having an outlet coupled to said first air cylinder for delivering compressed air thereto for shifting said power take-off; a first pilot operated valve having a main pressure fluid inlet, said first pilot operated valve having a pilot pressure fluid inlet coupled to said outlet of said first valve; said first pilot operated valve having a main pressure fluid outlet; a second pilot operated valve having a main pressure fluid inlet coupled to said main pressure fluid outlet of said first pilot operated valve; said second pilot operated valve having a pilot pressure fluid inlet; a second shutoff valve having an inlet coupled to and adapted to receive air under pressure from said reservoir; said second shutoff having an outlet coupled to and disposed to deliver compressed air to said pilot pressure fluid inlet of said second pilot operated valve; an air brake actuating cylinder coupled to and adapted to receive compressed air from said outlet of said second shutoff valve; said second pilot operated valve having a main pressure fluid outlet; a manually operable transmission ratio shifting mechanism having a first shifting lever coupled to said transmission and adapted to change drive ratios from said transmission to said wheels of said vehicles, a second air cylinder coupled to and adapted to receive compressed air from said main pressure fluid outlet of said second pilot operated valve; said second air cylinder having a first actuator coupled to said first shifting lever; said first actuator when operated being adapted and disposed to shift said first shifting lever to a neutral position such that said transmission does not transmit power to said wheels of said vehicle; said shifting mechanism having a ratio selecting shifting lever; a plurality of fixed detent means adapted to hold said ratio selecting shifting lever in any one of several ratio controlling positions; and resilient override means interconnecting said first shifting lever and said ratio selecting shifting lever, whereby said actuator may force said first shifting lever to said neutral position by deflecting said resilient override means while said ratio selecting shifting lever is held in a desired drive ratio position by one of said detent means; said resilient override means having a sufficient preload normally to positively actuate said first shifting lever to various transmission ratio controlling positions; said first actuator, when said second air cylinder is de-energized, being in non-interfering relation to said first shifting lever thereby allowing positive movement of said first shifting lever by means of said resilient override means in connection with said ratio selecting shifting levers; a neutral switch actuator coupled to said first shifting lever; a neutral switch operable by said neutral switch actuator when said first lever is in neutral position; a solenoid valve having a main pressure fluid inlet coupled to said main pressure fluid outlet of said second pilot operated valve; said solenoid valve having a main pressure fluid outlet; a third cylinder coupled to and adapted to receive compressed air from said last mentioned fluid outlet; said third cylinder having a throttle actuator adapted to open an engine throttle when said third cylinder is energized; a vehicle driving engine disposed and adapted to be operated by said throttle actuator; for increasing the operating speed of said engine when said third air cylinder is energized; and a manually operable trash packer control switch in electrical series circuit with said neutral switch whereby said vehicle driving engine may be speeded up when said packer control switch is operated; and a trash packer having a hydraulic actuator coupled to said hydraulic pump for receiving hydraulic pressure therefrom; said engine when speeded up being capable of delivering sufficient torque to operate said hydraulic pump and said hydraulic actuator of said trash packer; an electrical control for said trash packer electrically coupled with said packer control switch for energizing and controlling said hydraulic actuator of said trash packer.

3. The invention as defined in claim 1 wherein said third means comprises a manually operable ratio selecting lever; a shifting lever coupled to said transmission and adapted to change operating ratios of said transmission; resilient override means interconnecting said selecting lever and said shifting lever; a first power operated actuator having a first pin actuator, said first pin actuator having an elongated slot therein; a first pin disposed in said slot and coupled to said shifting lever; said first pin actuator, when moved in one direction, engagable with said first pin at an end of said slot to thereby move said shifting lever in a direction to deflect said resilient override means and to shift said transmission to a neutral position; detent means for holding said ratio selecting lever in a desired position whereby said resilient override means may automatically return said transmission from a neutral position to a drive position when the end of said slot is moved away from said pin and when said first power operated actuator moves said first pin actuator in a direction opposite to said one direction.

4. The invention as defined in claim 3 wherein said resilient override means is sufficiently rigid normally to accurately shift said shifting lever to various ratio positions when said resilient override means is actuated by said ratio selecting lever.

5. The invention as defined in claim 1 wherein said fourth means is provided with a second pin actuator having an elongated slot; a second pin on said engine throttle; an end of said last mentioned slot being engagable with said second pin when said fourth means is energized whereby said second pin may normally move freely in said last mentioned slot when said power operated actuator of said fourth means is not energized.

6. The invention as defined in claim 5 wherein said power operated actuator of said fourth means is provided with a fluid pressure responsive plunger disposed to operate said second pin actuator.

7. The invention as defined in claim 6 wherein a solenoid valve is coupled to said neutral switch; said solenoid valve coupled to said power operated actuator of said fourth means for delivering pressure fluid thereto when said neutral switch is energized through said trash packer control switch and when said transmission is held in neutral position by said third means.

8. The invention as defined in claim 7 wherein said power operated brake actuating means, when de-energized, causes de-energization of said third means thereby opening said neutral switch and de-energizing said fourth means to allow normal operation of said transmission and said engine throttle.

9. A control and power apparatus for operating trash collection vehicle packers comprising: a vehicle chassis having a hydraulically operable trash packer thereon; wheels supporting said chassis; a driving engine on said chassis; a transmission driven by said engine; said wheels driven by said transmission; a power take-off coupled to said transmission; a hydraulic pump driven by said power take-off; power operated brake actuating means disposed and adapted to actuate brakes for said wheels; manually operable means for operating said brake actuating means; second means adapted and disposed to shift said power take-off into coupling relation with transmission to start operation of said hydraulic pump for supplying hydraulic operating pressure to actuate said trash packer; first conduit means for conducting hydraulic fluid under pressure from said pump to said hydraulically operable trash packer; third means responsive to the operation of said brake actuating means and adapted to shift said transmission to neutral position so that driving force from said transmission to said wheels is automatically interrupted when said brake actuating means is operated to brake said wheels; a neutral switch operably responsive to said third means when said transmission is shifted to neutral position; an engine throttle for controlling the speed of said engine; fourth means having a power operated actuator coupled to said neutral switch for moving said throttle in a direction to increase the speed of said engine; and a manually operable trash packer control switch in series circuit with said neutral switch, whereby said fourth means is energized through said neutral switch when said trash packer control switch is operated and whereby the speed of said engine is automatically increased above normal idle speed to provide enough torque for driving said pump to deliver sufficient force to operate said trash packer.

* * * * *